United States Patent [19]

Hugl et al.

[11] 4,038,240
[45] July 26, 1977

[54] PROCESS FOR DYEING POLYURETHANE RESINS

[75] Inventors: Herbert Hugl; Gerhard Wolfrum, both of Leverkusen, Germany

[73] Assignee: Bayer Aktiengesellschaft, Leverkusen, Germany

[21] Appl. No.: 580,036

[22] Filed: May 22, 1975

[30] Foreign Application Priority Data

May 29, 1974 Germany .............................. 2426180

[51] Int. Cl.² .............................................. C08K 5/23
[52] U.S. Cl. ........................ 260/37 N; 260/77.5 AM
[58] Field of Search ..... 260/256.4 N, 37 N, 77.5 AM

[56] References Cited

U.S. PATENT DOCUMENTS

| | | | |
|---|---|---|---|
| 3,110,710 | 11/1963 | Rattee et al. | 260/256.4 N X |
| 3,137,671 | 6/1964 | Bosshard et al. | 260/858 |
| 3,278,486 | 10/1966 | Meek et al. | 260/77.5 AP X |
| 3,342,797 | 9/1967 | Guenthard | 260/256.4 N X |
| 3,531,456 | 9/1970 | Ackermann et al. | 260/256.4 N X |
| 3,598,801 | 8/1971 | Beffa et al. | 260/37 N X |
| 3,642,764 | 2/1972 | de Montmallin et al. | 260/37 N X |
| 3,856,772 | 12/1974 | Dunkelmann et al. | 260/256.4 N X |
| 3,880,797 | 4/1975 | Maeda et al. | 260/77.5 AM X |

Primary Examiner—Sandra M. Person
Attorney, Agent, or Firm—Plumley and Tyner

[57] ABSTRACT

Dyestuffs of the formula

F—B—A wherein:
F denotes the residue of a dye molecule which is free from reactive groups and from water solubilizing groups,
B denotes a direct bond or a bridge member, and
A denotes the group:

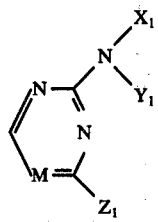

wherein:
M represents N, CH or C—Hal,
Hal represents halogen,
$Z_1$ represents $OZ_2$ or

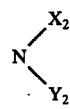

$X_1$ represents an optionally substituted ω-hydroxyalkyl group or ω-hydroxyalkenyl group,
$X_2$, $Y_1$ and $Y_2$ represent hydrogen or optionally substituted alkyl, alkenyl, aralkyl or aryl groups, or $X_1$ and $Y_1$ together with the nitrogen atom form a heterocyclic group; and
$Z_2$ represents an optionally substituted alkyl group with the proviso that at least one of the groups $X_2$, $Y_1$, $Y_2$ and $Z_2$ is an ω-hydroxyalkyl or alkenyl group, the groups $X_1$ and $Y_1$ may also combine with the nitrogen atom to form a heterocyclic ring, are suitable for the dyeing of polyurethane resins. The dyestuffs are incorporated in the resins with the formation of covalent bonds.

21 Claims, No Drawings

PROCESS FOR DYEING POLYURETHANE RESINS

This invention relates to a process for dyeing polyurethane resins with dyes which are suitable for incorporation in the resins with the formation of covalent bonds, characterised in that dyes of the formula:

$$F—B—A \qquad (1)$$

are added to the reaction mixture before or during the polyaddition reaction and polyaddition is then carried out or completed.

In formula (1), F represents the residue of a dye molecule which is free from reactive groups and from water solubilising groups, B represents a direct bond or a bridge member and A represents the group

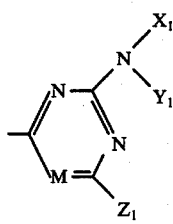

wherein:
M represents N, CH or C—Hal,
Hal represents halogen,
$Z_1$ represents $OZ_2$ or

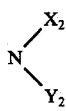

$X_1$ represents an optionally substituted ω-hydroxyalkyl group or ω-hydroxyalkenyl group,
$X_2$, $Y_1$ and $Y_2$ represent hydrogen or optionally substituted alkyl, alkenyl, aralkyl or aryl, and
$Z_2$ represents optionally substituted alkyl, with the proviso that at least one of the groups $X_2$, $X_1$, $Y_2$ and $Z_2$ is an or ω-hydroxyalkenyl group. The groups $X_1$ and $Y_1$ or $X_2$ and $Y_2$ may also combine with the nitrogen atom to form a heterocyclic ring.

Particularly suitable dye residues are those of the azo-, anthraquinone, perinone, quinophthalone, phthalocyanine and methine series.

Suitable bridge members are, for example, oxygen, NR—CO and NR wherein R represents hydrogen or a $C_1-C_4$ alkyl group, for example NH, $NCH_3$ or $NC_2H_5$.

By optionally substituted alkyl, alkenyl, hydroxyalkyl and hydroxyalkenyl groups are meant in particular straight chain or branched groups of this kind with 1 to 12 C-atoms which may be further substituted with for example hydroxyl, cyano or halogen, or interrupted by hetero atoms such as oxygen, the number of substituents being preferably 0 or 1.

Suitable aralkyl groups are those in which the alkyl portion contains 1 to 4 C-atoms and the aryl portion conforms to the definition given below.

Hal preferably stands for chlorine.

Suitable aryl groups are, for example, phenyl groups optionally substituted by halogen, $C_1-C_4$ alkyl, $C_1-C_4$ alkoxy, cyano, trifluoromethyl or hydroxyl, the halogen substituent being preferably fluorine, chlorine or bromine and in particular chlorine.

The group A is preferably a group of the formula:

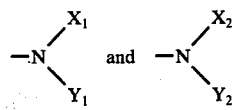

wherein
$X_3$ represents an ω-hydroxyalkyl group with 1 to 6 C-atoms, and
$X_4$, $Y_3$ and $Y_4$ represent hydrogen, $C_1-C_4$ alkyl or $C_1-C_6$ ω-hydroxyalkyl with the proviso that at least one of the groups $X_4$, $Y_3$ and $Y_4$ must be an ω-hydroxyalkyl group.

The following are examples of suitable groups of the formulae

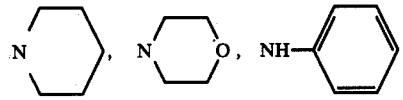

$NH—C_2H_4—OH$, $NH—C_3H_6—OH$, $N(C_2H_4OH)_2$, $N(CH_3)—C_2H_4OH$, $N(C_2H_5)C_2H_4OH$, $NHC_6H_{12}OH$, $N(C_2H_5)_2$,

and $NHC_4H_9$. B is preferably NH.

Only some of the dyes of formula (1) are already known. Another object of this invention is therefore dyes of the formula

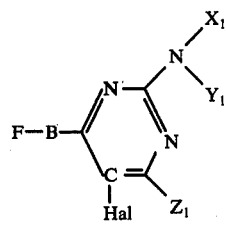

(2)

wherein:
F, B, Hal, $X_1$, $Y_1$ and $Z_1$ have the meaning mentioned above.

The dyes (2) are suitable not only for dyeing polyurethane resins by the process according to the invention but also for dyeing and printing polyesters and polyamides by conventional dyeing and printing processes using aqueous or organic dispersions or organic solutions of the dyes.

Dyes of formula (1) are obtained by reacting a suitable dye which contains hydroxyl groups or preferably amino groups or a corresponding dye intermediate product with cyanuric chloride or a tetrahalogen pyrimidine, for example trifluorochloropyrimidine, in known manner. The two remaining chlorine atoms of cyanuric chloride or the corresponding halogen atoms of the tetrahalogen pyrimidine are then substituted by —$NX_1Y_1$ or —$Z_1$ in known manner.

The various chlorine or other halogen atoms may be substituted differently by virtue of their differing reactivities. Dyes of formula (1) are also obtainable by first reacting cyanuric chloride or the tetrahalogen pyrimidine with the compounds $NHX_1Y_1$ and $HZ_1$, and then carrying out the reaction with the dye or dye intermediate product which contains hydroxyl or amino groups.

If a dye intermediate product is used, the last step of the process is followed by the reaction known per se for forming the dye.

The following are examples of suitable compounds of the formula $HZ_1$:
methanol, ethanol, n-propanol, n-butanol, n-hexanol, isopropanol, sec.-butanol, n-octanol, n-dodecanol, ethylene glycol, butane-1,4-diol, hexane-1,6-diol, diethylene glycol, triethylene glycol and compounds of the formula:

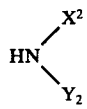

Suitable compounds if the formula $HNX_1Y_1$ or $HNX_2Y_2$ are, for example, methylamine, ethylamine, dimethylamine, diethylamine, diethanolamine, ethanolamine, N-methyl ethanolamine, ω-hydroxyhexylamine, dodecylamine, n-octylamine, 2-(β-hydroxyethoxy)-ethylamine, n-butylamine, morpholine, piperidine, aniline, benzylamine, propenylamine, ω-hydroxybutylamine, bis-(ω-hydroxybutylamine, propanolamine and N-ethyl ethanolamine.

Dyes of the following formula are preferably used for the process according to the invention:

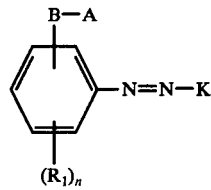

(3)

wherein:
$R_1$ represents hydrogen or a nonionic substituent,
K represents the group of a coupling component; and
n represents an integer of from 1–4, preferably 1 or 2, and B and A have the meaning indicated for formula (1).

By nonionic substituents are ment groups which do not confer solubility in water, of the kind commonly used in dye chemistry. The following are examples: $CF_3$, F, Br, Cl, CN, $C_1$–$C_4$-alkyl, $C_1$–$C_4$-alkoxy, $C_1$–$C_4$-hydroxyalkoxy, carbamoyl, sulphamoyl, $C_1$–$C_4$-alkoxy carbonyl, $C_1$–$C_4$-alkyl sulphonyl, $C_1$–$C_4$-alkyl carbonyl, $C_1$–$C_4$-alkyl carbonyl amino, $C_1$–$C_4$-alkylamino and $C_2$–$C_8$-dialkylamino.

The following are examples of the groups K which are suitable:

a. groups of mononuclear or dinuclear aromatic hydroxy compounds in which the hydroxy group is in the o- or p- position to the azo bridge, for example optionally substituted hydroxy benzene, hydroxy naphthalene, hydroxy diphenyl, hydroxy quinoline, hydroxy isoquinoline, hydroxy quinoxaline, hydroxy quinazoline or hydroxy cinnoline groups, the oxy group can be alkylated, hydroxyalkylated or acylated.

Among the dyes of formula (3), it is particularly preferred to use those in which K represents a hydroxy benzene group optionally substituted by F, Cl, Br, $C_1$–$C_4$-alkyl, $C_1$–$C_4$-alkoxy, amino, $C_1$–$C_4$-alkylamino, $C_2$–$C_8$-dialkylamino, phenyl, $C_1$–$C_4$-alkyl carbonylamino or formyl amino. Dyes of the type mentioned above have been described, for example, in Swiss Pat. Nos. 344 150, 344 151, 344 152 and 340 927. The oxy groups can be alkylated by $C_1$–$C_4$-alkyl, or hydroxyalkylate by $C_1$–$C_4$-hydroxyalkyl. Suitable alkylating and hydroxyalkylating means are alkyl halogenides as butyl bromide and methyl iodide, dialkyl sulfates as dimethyl and diethylsulfate and epoxides as ethylene, oxide, propylene oxide or butylene oxide. The reaction with e.g. 2 to 5 moles ethylene oxide can also lead to polyoxyalkylation. Suitable acylating means are e.g. benzene and toluenesulfonic acid chloride.

Dyes in which B represents NH, A represents

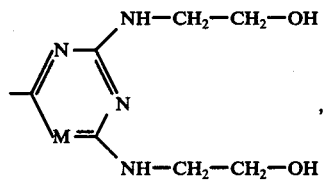

M represents C—Cl or N, and K represents a phenol or $C_1$–$C_4$-alkyl phenol group are particularly preferred.

Other dyes of formula (3) which are particularly preferred for the process according to the invention include those in which the group K has the following meaning:

b)

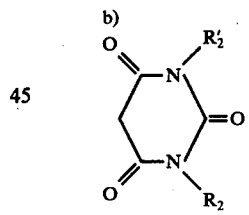

wherein:
$R_2$ and $R_2'$ represent H or $C_1$–$C_4$-alkyl, c)

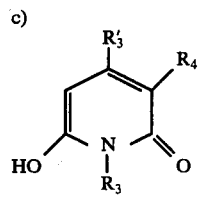

wherein:
$R_3$ and $R_3'$ represent H, $C_1$–$C_4$-alkyl or optionally -substituted phenyl, and
$R_4$ represents H, CN or $C_1$–$C_4$-alkoxy carbonyl, d)

-continued

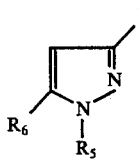

wherein:
$R_5$ represents hydrogen, $C_1$-$C_4$-alkyl, $C_1$-$C_4$-hydroxyalkyl, cyanoethyl, cyclohexyl, or phenyl optionally substituted by $CH_3$, $OCH_3$, halogen, $CONH_2$ or $SONH_2$
$R_6$ represents hydroxyl or amino, and
$R_7$ represents hydrogen, alkyl with 1-4 C-atoms, phenyl, tolyl, $NH_2$, $C_1$-$C_4$-alkoxy carbonyl, CN or $CONH_2$ or $CONHR_4'$ ($R_4' = C_1$-$C_4$-alkyl), $C_1$-$C_4$-alkyl), $C_1$-$C_4$-alkylamino or -dialkylamino, $C_1$-$C_4$-alkyl carbonyl amino, or benzolylamino optionally substituted by Cl, Br, $CH_3$ or $OCH_3$, e)

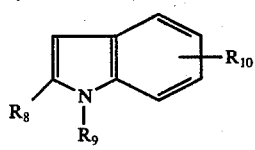

wherein:
$R_8$ represents alkyl with 1-4 C-atoms or an optionally substituted phenyl group,
$R_9$ represents hydrogen or alkyl with 1-4 C-atoms, and
$R_{10}$ represents hydrogen, cyano, halogen, alkyl with 1-4 C-atoms or alkoxy with 14 C-atoms, f)

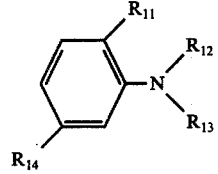

wherein:
$R_{11}$ represents hydrogen, halogen, $C_1$-$C_4$-alkyl, $C_1$-$C_4$-alkoxy or phenoxy,
$R_{12}$ and $R_{13}$ represent hydrogen, a $C_1$-$C_4$-alkyl optionally substituted, preferably once, by OH, CN, halogen, $C_1$-$C_4$-alkoxy, $C_1$-$C_4$-alkoxy carbonyl, $C_1$-$C_4$-alkoxy carbonyloxy or $C_1$-$C_4$-alkyl carbonyloxy, and
$R_{14}$ represents hydrogen, halogen, alkyl with 1-4 C-atoms, alkoxy with 1-4 C-atoms, carbamoylamino, sulphonylamino, trifluoromethyl, $C_1$-$C_4$-alkyl carbonylamino, optionally substituted phenyl carbonylamino, or $C_1$-$C_4$-hydroxyalkyl carbonylamino, g)

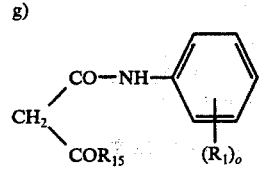

wherein
$R_{15}$ represents $C_1$-$C_4$-alkyl and
O denotes 1 to 5, and $R_1$ has the meaning mentioned above.

Particularly preferred dyes are those which contain

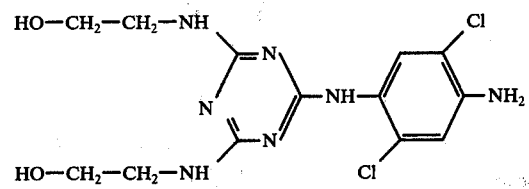

as diazo component with M = C—Cl or N, and

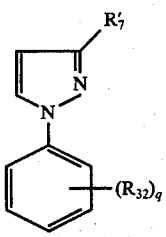

as coupling component
wherein:
$R_7'$ represents $CH_3$, CN, $CONH_2$, $C_1$-$C_4$-alkylamino,
$R_{32}$ represents chlorine or methyl and
q represents 0, 1 and 2.
Other suitable dyes include e.g. polyazo dyes of formula (4)

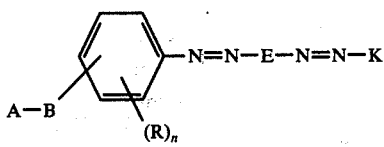

(4)

wherein:
E represents a phenylene or naphthalene group optionally substituted by $C_1$-$C_4$-alkyl or $C_1$-$C_4$-alkoxy, and A, B, R, n and K have the meaning indicated above.

Another group of preferred dyes of formula (1) conform to the formula $$D-N=N-K_1-(B-A)_m \qquad (5)$$

wherein
D represents the group of a carbocyclic or heterocyclic diazo component,
$K_1$ represents the group of a coupling component,
m represents 1 or 2, and
B and A have the meaning already indicated.
Suitable groups D are e.g. those of the benzene, naphthalene, tetrahydronaphthalene, thiazole, thiadiazole, triazole and benzothiazole series.
Suitable groups $K_1$ are e.g. those of the hydroxybenzene, aminobenzene, aminonaphthalene, 5-hydroxy pyrazole, 5-aminopyrazole and acetoacetic ester arylide series.
Among the dyes of formula (5), those which conform to the following formulae are particularly preferred:

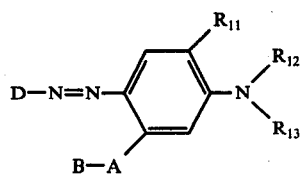
(5a)

wherein:
D, B, A, $R_{11}$, $R_{12}$ and $R_{13}$ have the meanings already indicated (U.S. Pat. No. 3,658,783);

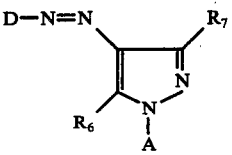
(5b)

wherein:
D, B, A, $R_{11}$, $R_{12}$ and $R_{14}$ have the meanings already indicated and "alkylene" stands for an alkylene group with 1–4 C-atoms;

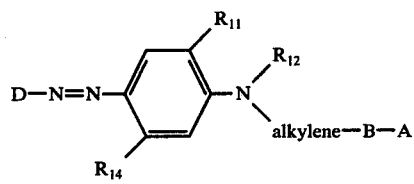
(5c)

wherein:
$R_{32}$ denotes hydrogen, $C_1$-$C_4$-alkyl or $C_1$-$C_4$-hydroxyalkyl,
$R_{16}$ denotes halogen, $C_1$-$C_4$-alkyl, $C_1$-$C_4$-alkoxy or acetylamino, and
D, B and A have the meanings already indicated;

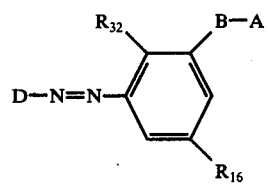
(5d)

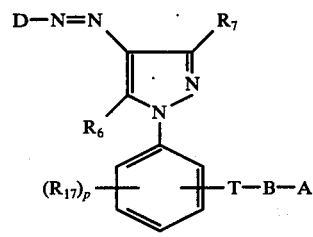
(5e)

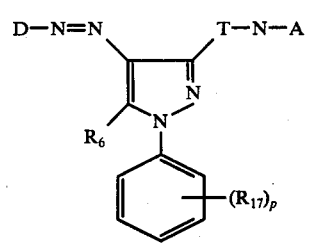
(5f)

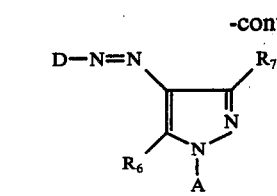
(5)

-continued wherein:
A, B, D, $R_6$ and $R_7$ have the meanings already indicated,
$p$ denotes an integer of from 1 – 4,
$R_{17}$ represents H, halogen, $C_1$-$C_4$-alkyl, $C_1$-$C_4$-alkoxy, $CONH_2$, $SO_2NH_2$, $C_1$-$C_4$-alkyl carbonyl amino, $C_1$-$C_4$-alkyl amino or $C_2$-$C_8$ dialkylamino, and
T represents a direct bond or —CO— or —$SO_2$ (U.S. Pat. No. 3,320,232 and 3,471,467);

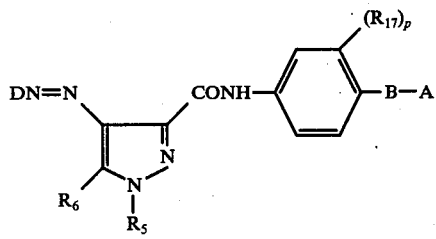
(5g)

wherein:
A, B, $p$, D, $R_6$, $R_5$ and $R_{17}$ have the meanings already indicated;

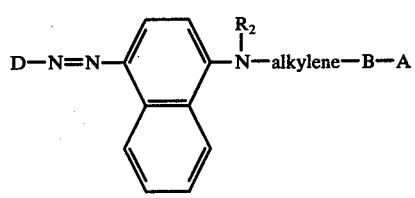
(5h)

wherein:
A, B, D, $R_2$ and alkylene have the meanings already indicated; and

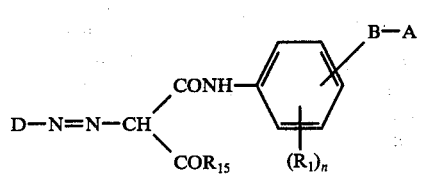
(5i)

wherein:
A, B, D, $n$, $R_1$ and $R_{15}$ have the meanings already indicated.

Dyes of the following formula are particularly preferred:

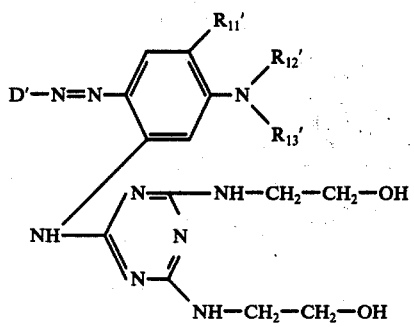

wherein:

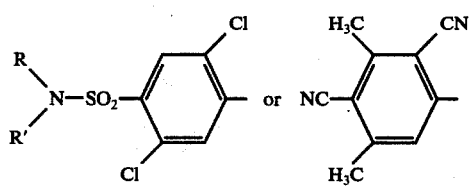

D' denotes
R and R' denote hydrogen or methyl,
$R_{11}'$ denotes hydrogen, methoxy or ethoxy,
$R_{12}'$ and $R_{13}'$ denote hydrogen, $C_1$-$C_4$-alkyl, hydroxyethyl, cyanoethyl, halogen-$C_1$-$C_4$-alkyl or $C_1$-$C_4$-alkyl carbonyloxyethyl.

Suitable anthraquinone dyes of formula (1) are those represented by the following formulae:

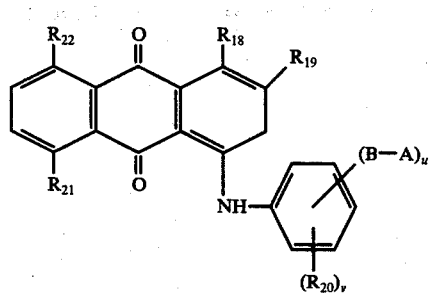 (6a)

wherein:
A and B have the meanings indicated above,
$R_{18}$ represents H, OH or $NH_2$,
$R_{19}$ represents H, halogen, in partiular Cl, Br or I, or a phenoxy group optionally substituted by Cl or OH,
$R_{20}$ represents H, Cl, Br or $OCH_3$,
$R_{21}$ represents H, OH or $NH_2$,
$R_{22}$ represents H, OH or $NH_2$,
u represents 1–2, and v represents 1–4 (British patent Specifications Nos. 960,235 and 948,007 and German Offenlegungsschriften Nos. 1,419,780; 1,288,788 and 1,212,610);

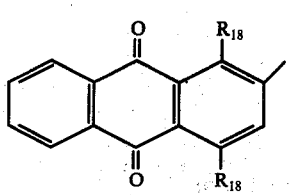 (6b)

wherein:
A, B an $R_{18}$ have the meaning indicated above and V represents

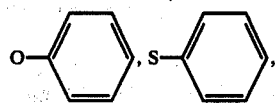,

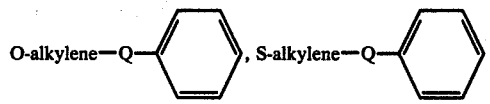

wherein alkylene has the meaning already indicated and
Q represents a direct bond, O or S;

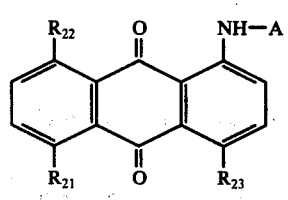 (6c)

wherein:
A, $R_{21}$ and $R_{22}$ have the meanings already indicated, and
$R_{23}$ represents H, OH, C-$C_4$-alkoxy or anilino;

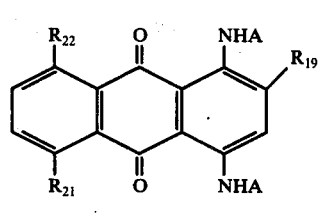 (6d)

wherein:
A, $R_{19}$, $R_{21}$ and $R_{22}$ have the meanings already indicated and

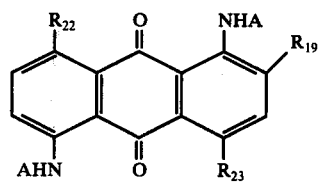 (6e)

wherein:
A, $R_{19}$, and $R_{23}$ have the meanings already indicated.

Suitable methine dyes conforming to formula (1) are those of the following formulae:

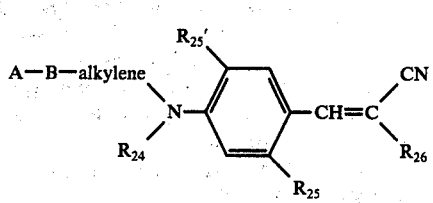 (7a)

wherein:

$R_{24}$ denotes hydrogen, $C_1$-$C_4$-alkyl, $C_1$-$C_4$-alkyl substituted by halogen, cyano or hydroxyl, $C_1$-$C_4$-alkoxy, $C_1$-$C_4$-alkoxy carbonyloxy or $C_1$-$C_4$-alkyl carbonyloxy, $R_{25}$ and $R_{25}'$ denote hydrogen, halogen, $C_1$-$C_4$-alkyl or $C_1$-$C_4$-alkoxy, $R_{26}$ denotes $C_1$-$C_4$-alkyl sulphonyl, carbamyl, $C_1$-$C_4$-alkoxy carbonyl and preferably cyano, and A, B and alkylene have the meanings already indicated; and

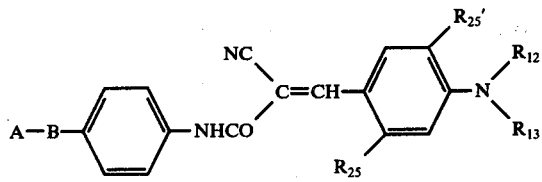

wherein:
A, B, $B_{12}$, $R_{13}$ and $R_{25}$ have the meanings already indicated.

Suitable bis-styryl dyes are those in which two monostyryl dye molecules, which may be identical to or different from each other, are joined together by a hydroxyl-substituted group $R_{24}$, $R_{12}$ or $R_{13}$, by a polyvalent acid chloride or acid anhydride, for example phosgene, cyanuric chloride or terephthalic acid dichloride, or by an isocyanate, for example hexamethylene diisocyanate or diphenyl methane diisocyanate.

Suitable quinophthalone dyes conforming to formula (1) are those of the formula:

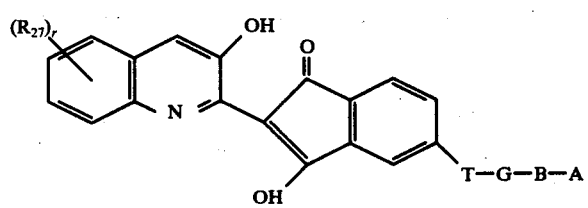

wherein:
A, B, T and alkylene have the meanings already indicated, $R_{27}$ denotes halogen, $C_1$-$C_4$-alkyl, $C_1$-$C_4$-alkoxy, $C_1$-$C_4$-alkylcarbonyl amino, formyl amino or benzoyl amino, r = 0 –4, preferably 0 –2, and G represents $C_1$-$C_4$-alkylene or phenylene optionally substituted by $R_1$, in particular by 1 or 2 halogen atoms or methoxy groups, and connected to B directly or through NH or O, wherein two adjacent groups $R_{27}$ optionally form the remaining members of a condensed benzene ring.

Other suitable dyes conforming to formula (1) include those of the following formula:

(9)

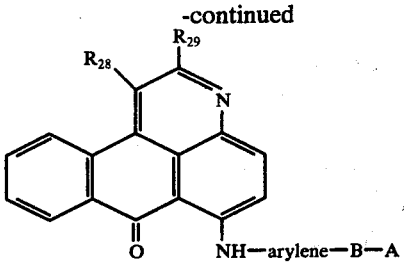

(7b)

wherin:
$R_{28}$ represents $C_1$-$C_4$-alkoxy carbonyl, $C_1$-$C_4$-alkyl carbonyl or benzoyl, $R_{29}$ represents hydroxyl, $C_1$-$C_4$-alkyl or phenyl group optionally substituted by halogen, $NO_2$, CN, $CF_3$, $CONH_2$, $SO_2NH_2$, $C_1$-$C_4$-alkyl and/or $C_1$-$C_4$-alkoxy, and arylene, denotes a phenylene group optionaly substitued by halogen or by a $C_1$-$C_4$-alkyl or $C_1$-$C_4$-alkoxy group and A and B have the meaning indicated above; S (8)

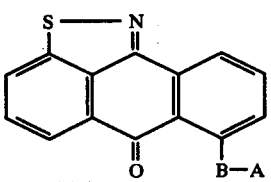

(10)

wherein:
B and A have the meaning indicated above:

L — T — G — B — A   (11)

wherein:
represents a phthaloperinone, naphthaloperinone, benzoylene benzimidazole or naphthoylene benzimidazole group optionally substituted by halogen and T, G, B and A have the meaning indicated, in particular those of the following formula:

(11a)

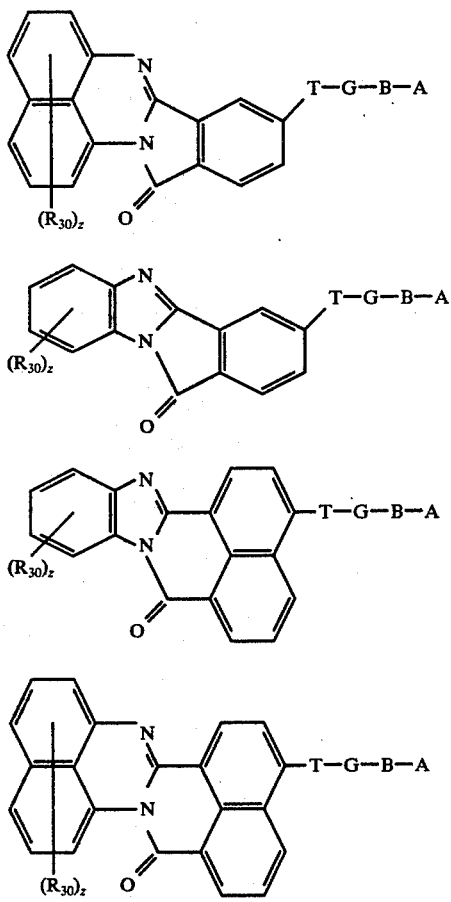

wherein:
R₃₀ denotes halogen,
z denotes 0 to 2, and
T, G, B and A have the meanings indicated above.
Phthalocyanine dyes of the formula

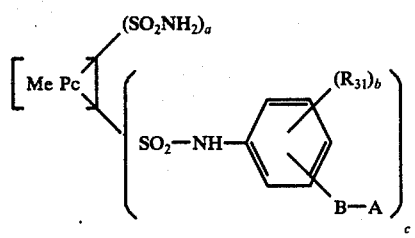

(12)

wherein:
A and B have the meanings already indicated, Me represent Cu, Ni or Co,
a denotes 0 to 3, preferably 2,
b denotes 1 to 4,
c denotes 1 to 4, preferably 1 and
$R_{31}$ denotes H, $C_1$-$C_4$-alkyl, $C_1$-$C_4$-alkoxy, halogen, carbamoyl or sulphamoyl
are also subitable.

The polyurethane resins which are to be dyed by the process according to the invention may be used for various purposes, for example as pressure-moulded articles, sheets, fibres, foams, lacquers and coating materials.

The polyurethanes may also contain other functional groups in the macromolecule, such as amide-urea or carbodiimide groups, in addition to the characteristic urethane groups.

The process according to the invention is carried out by adding the dye of formula (1) in some suitable form to the polyol or polyisocyanate component or to the reaction mixture before or during polyurethane formation. The subsequent stages of the reaction are carried out in the usual manner, i.e. as is customary for polyurethane resins which are not dyed. Details may be found in the relevant technical literature.

The dyes may be added solvent-free in the form of powder dyes, but are preferably added as solutions or dispersions in a suitable solvent or dispersing medium.

For the production of foams it has been found to be suitable to use solutions or dispersions in high-boiling organic liquids such as aliphatic or aromatic esters of phosphoric acid, phosphonic acid, phthalic acid or adipic acid, for example diphenyl isopropyl, diphenyl kresyl, diphenyl octyl, trichloroethyl and tributyl phosphate or dioctyl, butylbenzyl and dibutyl phthalate or dioctyl and octylbenzyl adipate, lactones such as butyrolactone, alcohols, in particular liquid polyalcohols, e.g. octaethylene glycol, or condensation products of adipic acid and butane-1,3-diol or propylene-1,2-glycol or ketones or ethers with boiling points above 180° C and vapour pressures below 1 m bar at 20° C.

Polyurethane foams dyed in this way may be either soft, semihard or hard foams or the so-called polyurethane integral foams.

Polyurethane thermoplasts dyed with the dyes used according to the invention and used for the manufacture of moulded articles by injection moulding, extrusion or calendering are obtained by adding the dye dissolved or dispersed in a polyol or in a diol used as chain-lengthening agent to the reaction mixture or to one of the components thereof, preferably to the polyol compound.

The polyols used may be polyesters which contain hydroxyl groups, in particular reaction products of dihydric alcohols and dibasic carboxylic acids or polyethers which contain hydroxyl groups, in particular addition products of ethylene oxide, propylene oxide, styrene, oxide or epichlorohydrin with water, alcohols or amines, preferably dialcohols.

Example of chain-lengthening diols include ethylene glycol, diethylene glycol, butane diol, hexane diol, octane diol and hydroquinone-β-hydroxyethylether.

If monohyric alcohols or monoamines are also used for producing the thermoplastic polyurethane, the dye may be dissolved or dispersed in these reactants. Suitable monohydric alcohols are e.g. hexanol, octanol, nonyl alcohol and isoctanol.

The dyes (1) are also suitable for dyeing polyurethane systems used for coating textiles. The dyed polyurethanes may be used as powders, solutions or dispersions. Details about their chemistry and technical applications may be found in the technicalliterature, e.g. in Melliand Textilberichte 53, 1272-1277 (972); 52, 1094-1099 (1971); 51, 1313-1317 (1970).

For powders used as coatings, the dye used according to the invention is most suitably dispersed in the polyol component before a prepolymer is prepared by reaction with a diisocyanate. This prepolymer is then reacted in the last stage with a diamine, the reaction being accompanied by chain-lengthening to produce a coloured, pourable, thermoplastic polyurethan powder.

For solutions of one-component polyurethane coating compounds and aqueous dispersions, the dye is simply added to the polyol components during the preparation of the polyurethane and incorporated in the polyurethane molecule in the reaction with the diisocyanate. For two-component polyurethane textile coating compounds, the dye may either be incorporated in the crosslinkable polyurethane or added to the cross-linkable polyurethane in the form of a paste dispersed in a suitable medium, for example, in a solution of a polyester polyurethane in methyl ethyl glycol/toluene, incorporation of the dye taking place in the last reaction stage in the course of the reaction with the diisocyanate.

Polyurethane elastomers from which elastomer filaments may be produced by the usual processes may be dyed with dyes of formula (1).

For this purpose the dye is finely divided in the dihydroxyl component before a prepolymer which contains NCO groups is prepared by reaction of the dihydroxyl component with a diisocyanate resulting in the dye being chemically incorporated in the prepolymer.

A polyurethane elastomer solution which can be dryspun or wet-spun to form filaments, or painted on glass plates and dried e.g. for 30 mintues at 70° C and 45 minutes at 100° C to form films can be obtained from a solution of the prepolymer by reaction with a diamine used as chain-lengthening agent.

Details about the preparation of polyurethane elastomer solutions may be found, for example, in Germain Offenlegungsschrift No. 1,962,602.

Dyeing of polyurethane lacquers with dyes of formula (1) is advantageously carried out by dissolving the dye in the solution which contains the polyisocyanate and the polyol component. The dyed lacquer is then applied to the surface which is to be lacquered and stoved on it, for example at 180° C for 30 minutes. The dye is firmly incorporated in the molecule so that it is very resistant to overlacquering and bleeding.

For all their various applications the dyes are advantageously used at a concentration of 0.005 –0.2%, preferably 0.05 –0.1%, based on the polyol component.

Polyurethane resins suitable for various fields of application are obtained having various colour tones and with exceptionally good fastness properties by the process according to the invention.

EXAMPLE 1 a. A mixture of 10.0% of the dye of the formula:

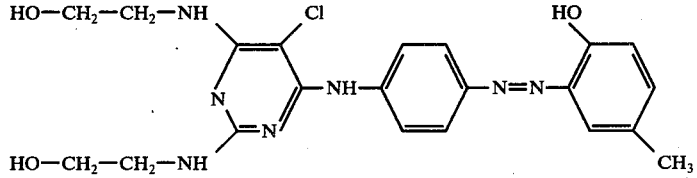

13.5% of butyl benzyl phthalate and 76.5% of a condensation product of adipic acid and propylene-1,2-glycol having a hydroxyl number of 112–113 and an acid number of 0.31 is homogenised by stirring and then ground up in a continuously operating commercial stirrer mill which contains as grinding elements glass balls 0.3–0.4 mm in diameter and in which the stirrer shaft equipped with flat circular discs rotates at a speed of 100 revs per min until the dye has been reduced to a particle size of less than 1–2 $\mu$.

To produce a yellow polyurethane foam, 0.5% by weight of the dye dispersion is fed to the mixing chamber of the foaming apparatus according to German Pat. No. 901,471 by a separate feed pump. After vigorous mixing of the reactants (formulations for a polyether foam and a polyester foam are described in the following paragraph), a foam with a uniform saturated yellow colour and uniform pore size is obtained which is distinguished by its very high light-fastness and fastness to bleeding.

b. To produce a polyether foam, 100 g of a conventional trifunctional polyether prepared from trimethylolpropane, propylene oxide aand ethylene oxide and having an OH-number of 35, 4 g of water, 0.8 g of a polysiloxane-polyalkylene block copolymer as stabiliser, 0.12 g of triethylene diamine as catalyst, 0.16 g of tin octoate and tolylene diisocyanate is used in a stoichiometric quantity, based on the quantity of polyether and water.

c. The following components are used to produce a polyester foam: 100 g of a polyester prepared from adipic acid and diethylene glycol (OH-number 50), 4 g of water, 1.4 g of N-methyl morpholine as catalyst, 1.5 g of an emulsifier consisting of an adduct obtained by the addition of ethylene oxide to a mixture of higher alcohols and having an average molecular weight of 1100 and an OH-number of 52, 3.8 g of a sulphonated castor oil, 0.2 g of paraffin oil and tolylene diisocyanate in a quantity which is stoichiometric in relation to the quantity of polyester and water.

EXAMPLE 2

Dye dispersions are prepared as described in Example 1 but the adduct of adipic acid and propylene glycol is replaced by a polydipropylene glycol adipate with an OH-number of 110–111 and an acid number of 0.2 or by a condensation product of adipic acid and butane-1,3-diol with an OH-number of 114 and an acid number of 0.36.

These dye dispersions also give rise to yellow ether or ester foams with excellent fastness values.

EXAMPLE 3 a. A yellow dye paste consisting of 20 g of the dye mentioned in Example 1 and 80 g of polyether obtained by reacting 1 mol of trimethylene propane with 3 mols of ethylene oxide and having an OH-number of 550 is prepared as follows: the dye is mixed with the above mentioned polyether by kneading in a dispersion kneader, using the quantity of polyether required to produce a tough, kneadable mass (about 0.4 of polyether to 1 g of dye). After a kneading time of 10 minutes, the mass is diluted very slowly with the remainder of the polyether while the mixture is constantly kneaded. A dye paste is obtained which is used for dying hard polyurethane integral foam.

b. 100 g of a polyol mixture with an OH-number of 495 and a viscosity of 1150 cP at 25° C consisting of 80 g of a polyether with an OH-number of 550 which has been obtained by the addition of ethylene oxide to trimethylolpropane and 20 g of a polyester with an OH-number of 370 which has been obtained by reacting 1 mol of adipic acid, 2.6 mol of phthalic acid anhydride, 1.3 mol of oleic acid and 6.9 mol of trimethylolpropane, are mixed with 1 g of a polysiloxanepolyalkylene oxide block copolymer as foam stabiliser, 0.5 g of tetramethyl guanidine as catalyst, 5 g of momofluorotrichloromethane as blowing agent and 5 g of the dye preparation described above. The mixture is fed into a two-compartment feeding and mixing apparatus in which the foamable reaction mixture is prepared from it by vigorously mixing it with 155 g of a polyisocyanate which has been obtained by phosgenating aniline-formaldehyde condensates followed by reaction with a diol of OH-number 480 and which has a viscosity of 130 cP at 25° C and an NCO-content of 28% by weight, and the resulting reaction mixture is then immediately introduced into a metal mould maintained at a temperature of 60° C. The yellow hard polyurethane integral foam which has a gross density of 0.6 g/cm$^3$ can be removed from the mould after 7 minutes. The mechanical properties (E modulus, flexural strength, elongation at break, impact strength, dimensional stability in the heat, etc.) of the coloured moulded product are not lowered compared with those of a crude moulded article which has not been dyed.

EXAMPLE 4

100 g of a polyester of ethane diol, butane diol and adipic acid with a molecular weight of 2000 (OH-number 56) are stirred up with a paste of 0.1 g of the dye described in Example 1 and 22 g of butane-1,4-diol as well as 1.2 g of n-octanol (0.037 mol based on butane-1,4-diol). 0.3 g of stearylamide and 1 g of stabiliser (2,6,2',6'-tetraisopropyldiphenylcarbodiimide) are also added and the mixure is heated to 90° C with stirring and mixed with equivalent quantities of 4,4'-diphenylmethane diisocyanate (74.6 g based on the total OH content) at 60° C with vigorous stirring. The mixture is then poured out on to a metal sheet and the solidified product is granulated and extruded.

A yellow moulded product of polyurethane elastomer is obtained.

EXAMPLE 5 a. 482.5 g of hexane diol polycarbonate with a molecular weight of 1050 are dehydrated at 125° C and 14 Torr, 3,4 g of the dye described in Example 1 are added at 120° C, the mixture is stirred for 10 minutes and left to cool to 100° C, 76.0 g of 1,6-diisocyanatohexane are added and the temperature is maintained at 100° C for half an hour.

The reaction mixture is then cooled to 60° C and after the addition of 4.0 g of N-methyl-diethanolamine and 169.5 g of acetone it is maintained at 60° C for 3 hours. After further cooling to 50° C, 3.1 ml of dimethyl sulphate in 400 g of acetone are added and the mixture is stirred for 20 minutes.

737 g of a 50% prepolymer solution in acetone is obtained which has an NCO-content of 1.1%. 743 g of the prepolymer are mixed with vigorous stirring with 165 g of a normal propylene diamine solution in water and 578 g of distilled water at 45° C.

The acetone is distilled off and the residue is washed with water, passed through an 0.5 mm sieve, suction-filtered and dried.

A yellow, easily pourable thermoplastic polyurethane powder with a melting point of 135° C is obtained. It is used for coating textiles.

b. The powder described above (spherical particles, average diameter 43 μ) is spread-coated on a separating paper in a thickness of 100 g/m$^3$ and then exposed to a temperature of 140° C in a blower channel 12 m in length through which it is moved at the rate of 1.5 m. A tough elastic frit is formed which can easily be separated from the support and handled without any other support.

c. The frit prepared as described in paragraph b) is again coated with the same powder (applied in a thickness of 60 g/m$^2$) and then treated in a channel at 170° C as described in Example 1. A homogeneous, yellow sheet is obtained which has a total thickness of 160 g/m$^2$ and has a high tensile strength, very good elastic properties and excellent light fastness.

d. The sheets formed as described in paragraphs (b) and (c) may be bonded by wet laminating in conventional manner on one or both sides to any support materials such as cotton fabrics, polyester fabrics, nonwoven webs, etc.. Substances such as polyurethane solutions, polyurethane dispersions or other adhesives are suitable for wet laminating but the layers may also be laminated by methods based on the principle of heat-sealing using thermoplastic resin powders.

e. A porous sheet produced according to paragraph (b) is spread-coated with a layer of the polyurethane powder from paragraph (a) (thickness of layer applied 80 g/m$^2$) and exposed to a temperature of 145° C. A nettle cloth (80 g/m$^2$) is laminated with the powder applied under pressure in a plastic state.

After cooling, the laminate is firmly bonded and can withstand more than 1 million flexures in the Bally Flexometer.

EXAMPLE 6

800 g of a copolyester of adipic acid with hexane-1,6-diol and 2,2-dimethyl-propane-1,3-diol in a molar ratio of 65:35 (OH-number 65.9) in which 0.8 g of the dye described in Example 1 has been finely dispersed are reacted for 1 hour at 60° C and 3 hours at 70°-80° C with 15.5 g of N,N-bis-(β-hydroxypropyl)-methylamine and 786 g of a solution of 260 g of diphenylmethane-4,4-diisocyanate in 650 g of dimethylformamide, which solution has an NCO-content of 9.21% after it has been left to stand for 1 hour. The NCO-content of the prepolymer is then 2.37%, based on the solids content.

37.7 g of terephthalic acid-bis-m-aminoanilide are stirred into 600 g of the above NCO prepolymer solution at 50° C and after 3 hours is diluted with 20 g of dimethylformamide. As the viscosity continues to rise, the mixture is diluted with dimethylformamide from time to time until, after about 20 hours and the addition of a total of 850 g of dimethylformamide, a homogeneous elastomer solution is obtained with a viscosity of 640 Poises at 20° C. The inherent viscosity of the elastomer substance determined as a 1% solution in hexamethyl phosphoramide at 25° C is 1.30. 1% acetic anhydride is added to the solution which is then spun by the usual dry-spinning process and the fibers are prestretched by 0 and 30%, respectively, when wound on spools and heat-fixed for 1 hour at 130° C. Another part of the solution is spun by the wet-spinning process.

Wet-spinning Process

A 20% elastomer solution is extruded at the rate of about 1 ml/min through a die having 20 apertures each of diameter 0.12 mm into a hot (80°-85° C) coagulating bath about 3 m in length of 90% by weight of water and 10% by weight of dimethylformamide and wound at a draw-off rate of 5 m per min after passage through a washing station (water/90° C). The spools are kept in water at 50° C for 1 hour and then dried.

Dry-spinning Process

An elastomer solution preferably at a concentration of 24-26% is extruded through a die having 16 apertures 0.20 mm in diameter into a 5 m long shaft heated to 220°-250° C into which air at about 210°-280° C is blown. The filaments are drawn off at the rate of about 100 m/min and after being dressed with a talcum suspension they are wound, e.g. at a rate of 125-175 m/min, and optionally stretched at the same time. The filaments may subsequently be aftertreated by heat on spools or in a continuous form. Higher spinning velocities may be employed if desired, e.g. 300-400 m/min, in which case no subsequent stretching process is required.

Yellow, highly elastic filaments are obtained which have a very high light fastness and wet fastness as well as very good thermal, hydrothermal and mechanical properties.

EXAMPLE 7 a. 35 g of the dye described in Example 1 and 65 g of an 8.5% solution in a 1:1 mixture of methyl ethyl glycol and toluene of apolyester polyurethane which has been obtained by reacting a polyester resin of hexane diol and adipic acid (average molecular weight 800) with tolylene-1,4-diisocyanate are ground in a ball mill for 12 hours. The resulting pigment paste is suitable for pigmenting any commercial two-component polyester polyurethane compounds used for textile coating.

b. 10 g of the yellow pigment paste described in paragraph (a) are slowly stirred into a solution consisting of 30 g of a cross-linkable polyester polyurethane having OH end groups and 70 g of ethyl acetate. A stable dispersion is obtained within a short time (3 to 5 minutes). After the addition of a polyisocyanate prepared by reacting 1 mol of trimethylolproane and 3 mol of tolylene diisocyanate using a heavy metal salt as accelerator, this dispersion is suitable for coating textiles by reversal coating or direct coating. Polyurethane films prepared from it by known processes are coloured a uniform yellow which is free from patches and fast to light and solvents.

EXAMPLE 8

A 30% solution containing a phenol masked polyisocyanate with 12% of NCO and a branched polyester with a hydroxyl content of 12 in proportions by weight of 2:1 in equal parts of cresol, xylene and glycol monomethyl ether acetate is used to dissolve 0.3%, based on the polyester content, of the dye mentioned in Example 1. The yellow lacquer is applied to an aluminum foil, using lacquer particles of 100 μu, and is then stoved for 30 minutes at 180° C.

The colour of the lacquer is preserved even after stoving. The dye is built into the hardened binder. When the lacquer is covered with a white lacquer stoved at 130° C for 30 minutes, no bleeding of the dye is observed.

EXAMPLE 9

The dye used in the preceding examples is prepared as follows:

227 g of 4-amino-2'-hydroxy-5'-methyl-azobenzene are reacted as a fine aqueous suspension with 168.5 g of 2,4,6-trifluoro-5-chloropyrimidine at 5° C. The reaction mixture is kept neutral by means of 400 g of 10% sodium hydroxide solution. The monoazo dye of the formula:

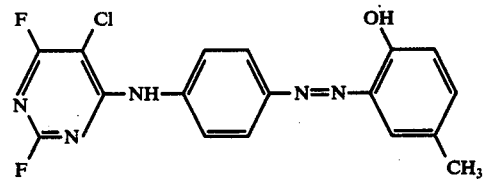

is obtained in a high yield after completion of the reaction, filtration and drying.

375 g of the dye are dissolved in 4 l of n-butanol and mixed with 250 g of ethanolamine by stirring for 8 hours at 90° C. The solution is then cooled and the resulting precipitate of dye having the formula

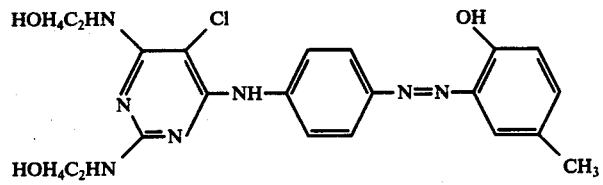

is filtered off, washed and dried.

Other valuable dyes having the colours indicated below are obtained from the components shown in the table by analogous procedures:

| No. | Dye component | 2nd component | amine | dye |
|---|---|---|---|---|
| 1 | 4-amino-2,5-dichloro-5'-methyl-2'-hydroxy-azobenzene | cyanuric chloride | ethanol-amine | yellow |
| 2 | 4-amino-2-methoxy-4'-hydroxy-azobenzene | cyanuric chloride | propanol-amine | yellow |
| 3 | 4-amino-2'-methoxy-5'-methyl-azo-benzene | cyanuric chloride | ethanol-amine | yellow |
| 4 | 4-amino-2'-hydroxy-5'-methyl-azo-benzene | cyanuric chloride | diethanol-amine | yellow |
| 5 | 4-amino-2'-hydroxy- | 2,4,5,6- | diethanol- | yellow |

-continued

| No. | Dye component | 2nd component | amine | dye |
|---|---|---|---|---|
|  | 5'-methyl-azo-benzene | tetrachloro-pyrimidine | amine |  |
| 6 | 2,5-dichloro-4-amino-5'-methyl-2'-hydroxy-azobenzene | 2,4,5,6-tetrachloro-pyrimidine | ethanol-amine | yellow |
| 7 | 1-hydroxy-2-(2,5-dichloro-4-amino-phenyl-azo)-4-methoxy-naphthalene | cyanuric chloride | ethanol-amine | red violet |

Further valuable dyestuffs are obtained if the dye compounds are reacted with dimethyl sulfate or with ethylene oxide.

EXAMPLE 10

234 g of dye of the formula

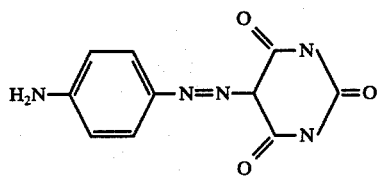

are reacted in a manner analogous to Example 9, first with 168.5 g of 2,4,6-trifluoro-5-chloro-pyrimidine and then with 210 g of diethanolamine with the addition of 270 g of sodium acetate. The dye of the formula:

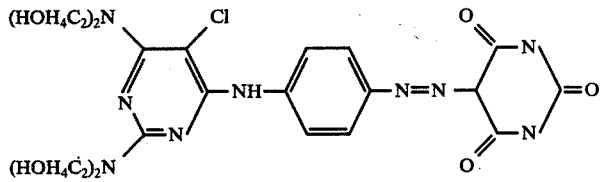

is filtered off, washed and dried. It dyes polyurethane resins according to Examples 1 to 8 to a yellow colour having a green tinge.

A yellow dye is obtained by reacting 4-(2,5-dichloro-4-amino-phenylazo)-barbituric acid with cyanuric chloride and ethanolamine in analogous manner.

EXAMPLE 11

219 g of 2,5-dichloro-4-amino-acetanilide are reacted in the form of a fine aqueous suspension with 168 g of 2,4,6-trifluoro-5-chloro-pyrimidine at 5° C. The reaction mixture is kept neutral by means of 400 g of 10% sodium hydroxide solution. After termination of the reaction, 6-(2,5-dichloro-4-acetylamino)-phenylamino-2,4-difluoro-5-chloro-pyrimidine is separated by suction filtration, dissolved in 3 l of n-butanol and stirred up with 140 g of ethanolamine for 8 hours at 90° C. The acid formed during the reaction is neutralised by the addition of 300 g of soda. 1 kg of concentrated sodium hydroxide solution is then added and the reaction mixture is stirred under nitrogen at 80° C for 6 hours. After determination of the diazotisable amine content, the reaction mixture is adjusted to pH 1 with hydrochloric acid and diazotised by the addition of an equivalent quantity of sodium nitrite solution at 0° C. After removal of the nitrite excess with amino sulphonic acid, the diazonium salt solution is added to an equimolar quantity of 2,6-dihydroxy-3-cyano-4-methyl-pyridine at 0° C and the solution is buffered with sodium acetate. After the coupling reaction, the dye of the formula:

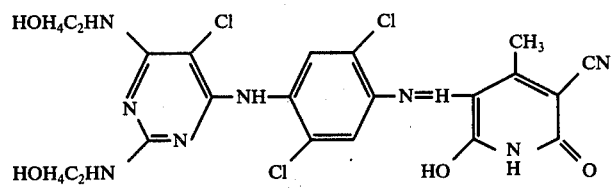

is suction-filtered, washed and dried. It dyes polyurethane resins according to Examples 1 to 8 to a yellow colour having a green tinge.

Other valuable yellow dyes having a green tinge are obtained when diethanolamine is used instead of ethanolamine, cyanuric acid chloride is used instead of 2,4,6-trifluoro-5-chloropyrimidine or 2-chloro-4-aminoacetanilide is used instead of 2,5-dichloro-4-aminoacetanilide.

EXAMPLE 12

407.5 g of 6-(2,5-dichloro-4-amino)-phenylamino-2,4-di-(2-hydroxy-ethylamino)-5-chloro-pyrimidine are diazotised analogously to Example 11 and added to a solution of 190 g of 1-phenyl-3-methyl-5-amino-pyrazole and 500 g of sodium acetate in 2 l of water. After the coupling reaction, the dye of the formula:

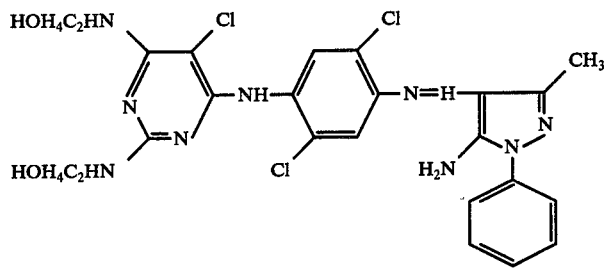

is filtered off, washed and dried. Polyurethanes are coloured a green tinged yellow according to Examples 1 to 8.

Other valuable dyes having the tones indicated below are obtained in analogous manner from the components shown in the table.

| No. | Diazo component | Coupling component | Colour tone |
|---|---|---|---|
| 1 | 6-(2,5-dichloro-4-amino-phenylamino)-2,4-di-[bis-(2-hydroxyethyl)-amino]-1,3,5-triazine | 1-phenyl-3-methyl-5-pyrazolone | yellow with red tinge |
| 2 | 6-(2,5-dichloro-4-amino-phenylamino)-2,4-di(3-hydroxypropyl-amino)-1,3,5-triazine | 1-(2,5-dichloro-phenyl)-3-methyl-5-pyrazolone | yellow with red tinge |
| 3 | 6-(2,5-dichloro-4-amino-phenylamino)-2,4-di-(2-hydroxyethyl-amino)-1,3,5-triazine | 1-(2-hydroxy-ethyl)-3-methyl-5-amino-pyrazole | yellow |

EXAMPLE 13

407.5 g of 6-(2,5-dichloro-4-amino-phenylamino)-2,4-di-(2-hydroxy-ethylamino)-5-chloro-pyrimidine are diazotised analogously to Example 11 and run into a solution of 150 g of 2-methyl indole in 300 ml of glacial acetic acid. The reaction mixture is then buffered with 1 l of saturated sodium acetate solution. After the coupling reaction, a yellow dye of the formula

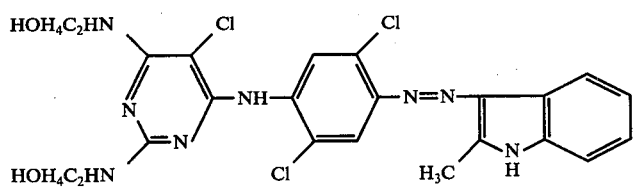

is suction-filtered, washed and dried.

A orange dye is obtained when using 2-phenyl indole and 6-(2,5-dichloro-4-amino-phenylamino)-2,4-di-[bis-(2-hydroxyethyl)-amino]-1,3,5-triazine.

EXAMPLE 14

407.5 g of 6-(2,5-dichloro-4-amino-phenylamino)-2,4-di-(2-hydroxy-ethylamino-5-chloro-pyrimidine are diazotised as in Example 11 and run into a solution of 250 g of 3-(N-ethylbenzyl amino)-toluene, 500 g of sodium acetate and 2 l of water. After the coupling reaction, the dye of the formula

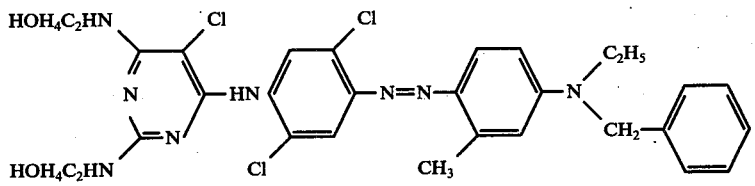

is suction-filtered, washed and dried. It dyes polyurethane resins according to Examples 1 to 8 to an orange colour having a red tinge.

Other valuable red dyes are obtained from 6-(2,5-dichloro-4-amino-phenylamino)-2,4-di-(2-hydroxyethylamino)-1,3,5-triazine and N,N-bis-(2-acetoxyethyl)-2-methoxy aniline as well as from 6-(2,5-dichloro-4-aminophenyl)-amino-2,4-di-[bis-(2-hydroxyethyl)-amino]-1,3,5-triazine and N-benzyl-N-(2-cyanoethyl)-3-methyl aniline.

EXAMPLE 15

314 g of a diazo dye of the formula:

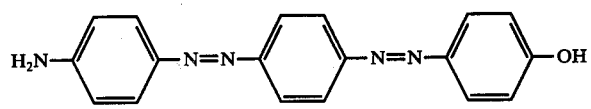

are reacted in the form of a fine aqueous suspension with 168.5 g of 2,4,6-trifluoro-5-chloropyrimidine at 5° C. The reaction mixture is kept neutral by means of 400 g of 10% sodium hydroxide solution. After completion of the reaction, the reaction product of the formula:

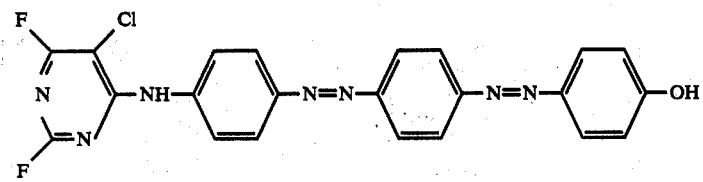

is suction-filtered, washed and dried. 465.5 g of this reaction product are dissolved in 5 l of n-butanol and stirred up with 210 g of diethanolamine and 270 g of sodium acetate for 6 hours at 90° C. When cold, the yellow dye of the formula:

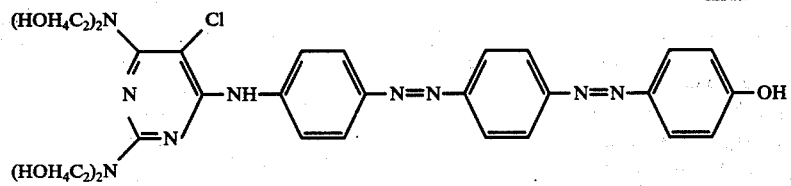

is suction-filtered, washed and dried.

Corresponding yellow dyes are obtained from 4-(2,5-dichloro-4-aminophenylazo)-5'-methyl-2'-hydroxyazobenzene, cyanuric chloride and ethanolamine as well as from 4-(4-aminophenylazo)-3',5'-dimethyl-2'-methoxyazobenzene, cyanuric chloride and diethanolamine.

Similar dyestuffs are obtained if the starting azo dyestuffs are reacted with ethylene oxide or methyliodide.

EXAMPLE 16

407.5 g of 6-(2,5-dichloro-4-amino-phenylamino)-2,4-di-(2-hydroxy-ethylamino)-5-chloro-pyrimidine are diazotised analogously to Example 11 and run into a solution of 270 g of acetic acid-2,5-dichloroanilide, 500 g of sodium acetate and 2 l of water. After completion of the coupling reaction, the dye of the formula:

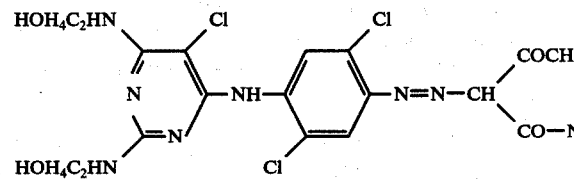

is suction-filtered, washed and dried. It dyes polyurethanes according to Examples 1 to 8 a yellow colour having a green tinge.

Yellow dyes having a green tinge which can be used according to Examples 1 to 8 to prepare fast coloured polyurethanes are also obtained when using a diazo component of 2,5-dichloro-phenylene diamine, cyanuric chloride and ethanolamine and acetic acid-o-anisidide as coupling component as well as when using a diazo component of 2,5-dichlorophenylene diamine, cyanuric chloride and diethanolamine and acetic acid-(4-acetylaminoanilide) as coupling component.

EXAMPLE 17

318 g of the dye of the formula:

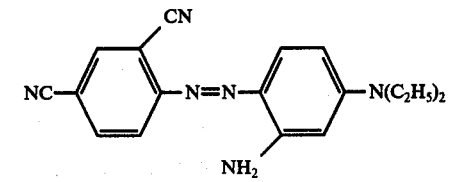

are reacted with 168.5 g of 2,4,6-trifluoro-5-chloropyrimidine at 5° C analogously to Example 9. After termination of the reaction, the reaction mixture is poured on to 3 kg of ice water, suction-filtered, washed and dried under vacuum at room temperature. 466.5 g of the product are dissolved in 4 l of n-butanol and stirred up with 250 g of ethanolamine for 8 hours at 90° C. The solution is then cooled and the resulting precipitate of red dye of the formula:

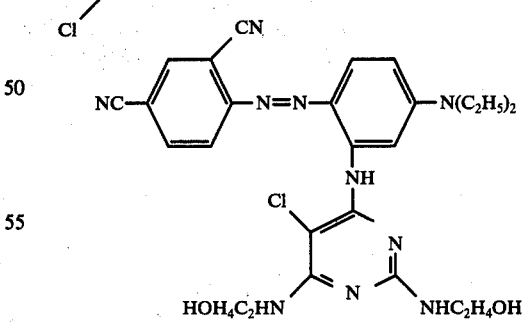

is filtered off, washed and dried.

Other dyes having the colour tones shown below are prepared from the components given in the table:

| No. | Azo dye | 2nd component | Amine | Colour tone |
|-----|---------|---------------|-------|-------------|
| 1 | 2,4-dicyano-3,5-dimethyl-2'-amino-4'-diethylamino- | cyanuric chloride | ethanolamine | red |

| No. | Azo dye | 2nd component | Amine | Colour tone |
|---|---|---|---|---|
| 2 | 2,5-dichloro-4-bis-(2-hydroxyethyl)-amino-sulphonyl-2'-amino-4'-(2-acetoxy-ethylamino)-azobenzene | cyanuric chloride | ethanol-amine | red |
| 3 | 2,5-dichloro-4-ethyl-amino-sulphonyl-2'-amino-4'-diethyl-amino-5'-methoxy-azobenzene | cyanuric chloride | diethanol-amine | violet |

EXAMPLE 18

168 g of N-ethyl-N-(2-aminoethyl)-m-toluidine are reacted with 168.5 g of 2,4,6-trifluoro-5-chloro-pyrimidine in a fine aqueous suspension at 5° C. The reaction mixture is kept neutral by means of 400 g of 10% sodium hydroxide solution. After completion of the reaction, the reaction mixture is poured into 2 l of ice water, filtered off, washed and dried under vacuum at room temperature. 316.5 g of the product are dissolved in 3 l of n-butanol and stirred with 250 g of ethanolamine for 8 hours at 90° C. The solution is then cooled and poured into 4 l of ice water and the resulting precipitate of coupling component of the formula:

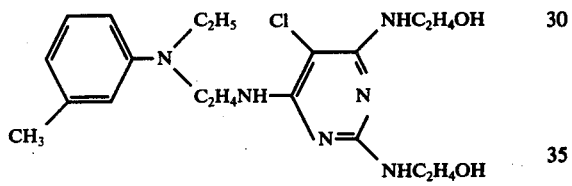

is filtered off, washed and dried.

171 g of 2,4-dicyano-3,5-dimethyl-aniline are dissolved in 900 ml of concentrated sulphuric acid and diazotised by adding 305 g of 42% nitrosyl sulphuric acid solution dropwise at −3° C over a period of 30 minutes. The reaction mixture is stirred for 1 hour at 0° C and then poured on to 3 kg of ice and any excess of nitrite present is destroyed by the addition of amidosulphonic acid. This diazonium salt solution is poured at 0° C into a solution of 330 g of the coupling component mentioned above, 1 kg of sodium acetate and 7 l of water. After termination of the coupling reaction, the dye of the formula:

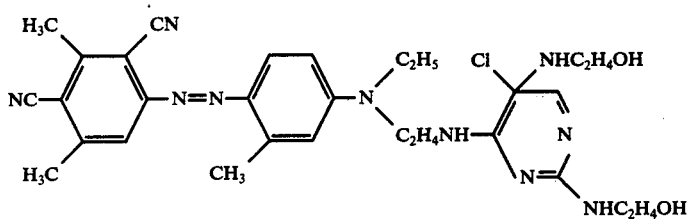

using which red polyurethane resins may be obtained according to Examples 1 to 8 is filtered off, washed and dried.

Other valuable dyes which have the colour tones indicated below are obtained when the components shown in the table are used in accordance with the procedure described above.

| No. | 1st component | 2nd component | amine | diazo component | colour tone |
|---|---|---|---|---|---|
| 1 | N-ethyl-N-(2-hydroxyethyl)-m-toluidine | 2,4,6-trifluoro-5-chloro-pyrimidine | diethanol-amine | 2,4-dicyano-aniline | red |
| 2 | N-ethyl-N-(2-hydroxyethyl)-o-anisidine | cyanuric chloride | ethanol-amine | 2,5-dichloro-4-ethyl-amino-sulphonyl-aniline | red with blue tinge |
| 3 | N-ethyl-N-(2-aminoethyl)-m-toluidine | cyanuric chloride | ethanol-amine | 2,5-dichloro-4-diethyl-amino-sulphonyl-aniline | red |
| 4 | 2-amino-4-chloro-phenol | 2,4,6-trifluoro-5-chloro-pyrimidine | diethanol-amine | 2,4-dicyano-aniline | red |

EXAMPLE 19

371 g of a dye of the formula:

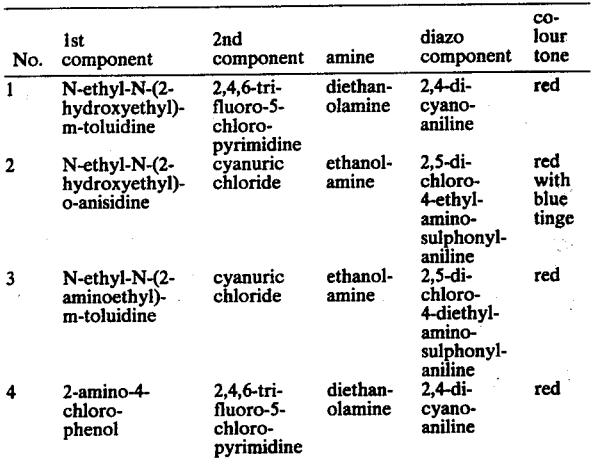

are dissolved in 5 l of acetone and reacted with 168.5 g of 2,4,6-trifluoro-5-chloro-pyrimidine at 5° C. The reaction mixture is kept neutral by means of 400 g of 10% sodium hydroxide solution. After completion of the reaction, the solution is poured into 5 l of ice water, filtered off, washed and dried in a vacuum at a temperature of 20° C. 519 g of the product are dissolved in 6 l of n-butanol and stirred up with 250 g of ethanolamine for 8 hours at 90° C. The solution is then cooled and the resulting precipitate of the dye of the formula:

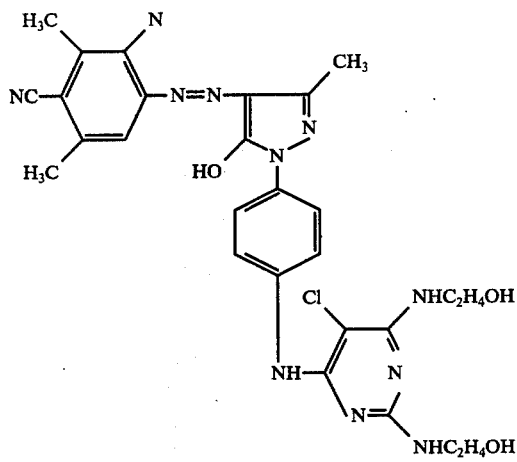

is suction-filtered, washed and dried.

Other dyes are obtained in analogous manner from the following components:

| No. | 1st component | 2nd component | amine | colour tone |
|---|---|---|---|---|
| 1 | 1-(4-amino-phenyl)-3-methyl-4-[2,5-dichloro-4-(2-hydroxyethyl)-aminosulphonyl-phenylazo]-5-hydroxy-pyrazole | cyanuric chloride | ethanol-amine | yellow with red tinge |
| 2 | 1-phenyl-3-amino-4-(2,4-dicyano-phenylazo)-5-hydroxy pyrazole | cyanuric chloride | 3-propanol-amine | yellow with red tinge |
| 3 | 1-phenyl-3-amino-4-(2,4-dicyano-3,5-dimethyl-phenylazo)-5-hydroxy pyrazole | 2,4,6-trifluoro-5-chloro-pyrimidine | ethanol-amine | yellow with red tinge |

EXAMPLE 20

168.5 g of 2,4,6-trifluoro-5-chloro-pyrimidine are run into a suspension of 125 g of ethanolamine, 500 ml of n-butanol and 170 g of sodium bicarbonate at 40° C. The reaction mixture is then stirred for 4 hours at 40° C. A further 300 ml of n-butanol, 50 g of hydrazine hydrate and 84 g of sodium bicarbonate are added and the suspension is stirred for 8 hours at 80° C. It is then poured on to 1 l of ice water, filtered off, washed and dried. 250.5 g of the resulting 4,6-di-(2-hydroxyethylamino)-5-chloro-2-hydrazino-pyrimidine are stirred up with 2.5 l of water and made slightly acidic with 180 g of sodium carbonate at 55° C. 140 g of ethyl acetoacetate are added, followed by 1 l of water. The hydrazone is filtered off and redissolved in 4 l of water and 120 g of 33% sodium hydroxide solution and stirred for 8 hours at 45° C. The solution is then filtered after the addition of 10 g of active charcoal. The coupling component of the formula:

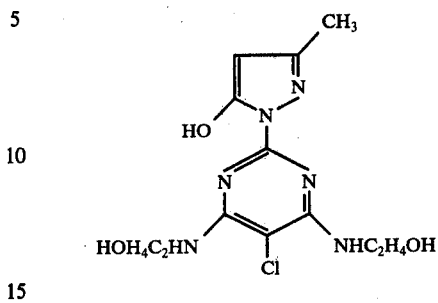

is precipitated from the filtrate by the addition of about 200 ml of 30% hydrochloric acid. It is filtered off, washed and dried.

171 g of 2,4-dicyano-3,5-dimethyl aniline are diazotised as in Example 18 and poured into a solution of 350 g of the coupling component, 1 g of sodium acetate and 7 l of water at 0° C. After completion of the coupling reaction, the resulting dye of the formula:

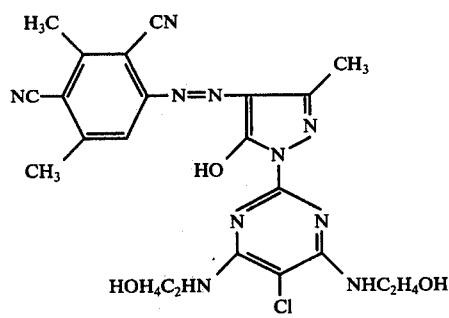

is filtered off, washed and dried. It colours polyurethane resins yellow according to the process of Examples 1 to 8.

If cyano acetate is used instead of ethyl acetoacetate and 2,5-dichloro-4-ethylamino sulphonyl aniline is used as diazo component, an amino pyrazole dye is obtained which can be used for producing polyurethane resins having a green tinged yellow colour according to Examples 1 to 8.

Another green tinged yellow dye is obtained by using cyanuric chloride, ethanolamine, hydrazine hydrate, cyano acetone and 2,4-dicyano aniline in accordance with the method described above.

A yellow dye is obtained from cyanuric chloride, ethanolamine, hydrazine hydrate, ethyl-aceto-acetate and 2,5-dichloro-4-(2-hydroxy-ethylamino)-sulphonyl aniline.

EXAMPLE 21

171 g of 2,4-dicyano-3,5-dimethyl-aniline are diazotised in a manner analogous to Example 18. The clear diazonium salt solution is run into a solution of 550 g of coupling component of the formula:

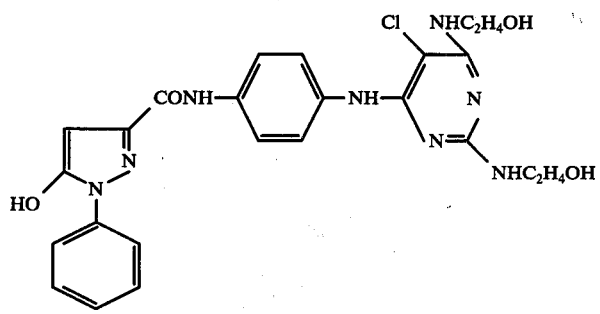

1 kg of sodium acetate and 7 l of water at 0° C. After completion of the coupling reaction, the resulting dye of the formula:

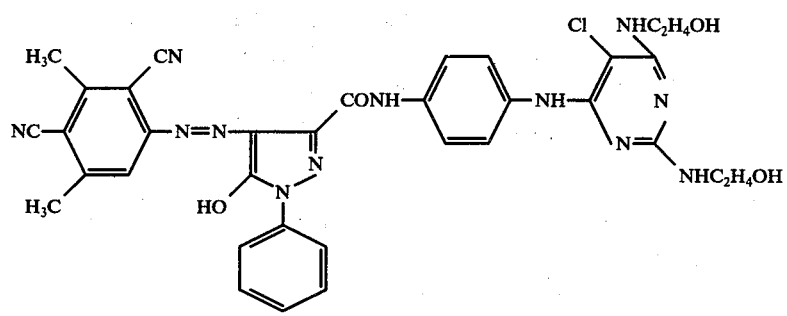

is suction-filtered, washed and dried. It imparts an orange colour with a red tinge.

The coupling component is prepared by boiling 221.5 g of 1-phenyl-5-pyrazolone-3-carboxylic acid chloride and 338.5 g of 2,4-di-(2-hydroxyethylamino)-5-chloro-6-(4'-amino)-phenyl-amino pyrimidine (prepared analogously to Example 11) in 80 g of pyridine and 1.5 l of dehydrated chlorobenzene under reflux for 4 hours.

600 ml of chlorobenzene are then distilled off under vacuum. When cold, the precipitate is filtered off, washed and dried.

Another orange dye is obtained when 2,5-dichloro-4-(2-hydroxyethyl)-amino-sulphonyl-aniline is used as diazo component and the pyrimidine derivative is replaced by the corresponding triazine derivative.

EXAMPLE 22

368 g of the dye of the formula:

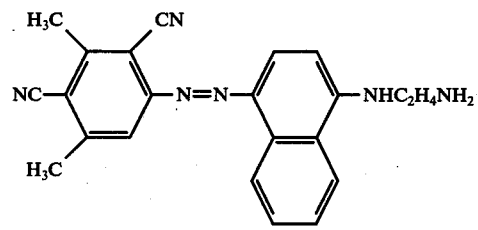

are reacted analogously to Example 9, first with 168.5 g of 2,4,6-trifluoro-5-chloro-pyrimidine and then with 250 g of ethanolamine.

The dye of the formula:

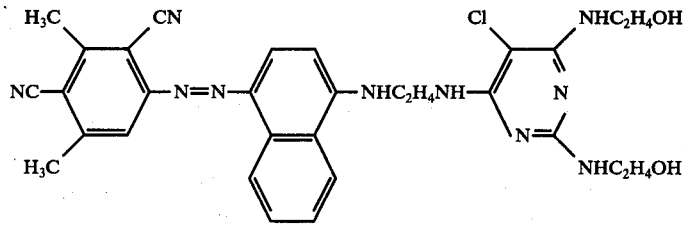

can be used successfully for producing violet-coloured polyurethane resins according to Examples 1 to 8.

Other analogous dyes are obtained from 1-(2-aminoethylamino)-4-(2,5-dichloro-4-ethylaminosulphonyl phenylazo)naphthalene, cyanuric chloride and 3-hydroxypropylamine (violet); from 2,4-dicyano-3,5-dimethyl-phenylazo)-acetic acid-(4-aminoanilide), 2,4,6-trifluoro-5-chloropyrimidine and ethanolamine (yellow); and from (2,5-dichloro-5-(bis-(2-hydroxyethyl)-aminosulphonyl)-phenylazo)-acetic acid-(4-aminoanilide), cyanuric chloride and ethanolamine (yellow).

EXAMPLE 23

223 g of 1-aminoanthraquinone, 168.5 g of 2,4,6-trifluoro-5-chloro-pyrimidine and 84 g of sodium bicarbonate are stirred up in 1.5 l of nitrobenzene for 6 hours at 140° C. When the reaction mixture is cold, it is suction-filtered, washed and dried. 371 g of the product are stirred up with 250 g of ethanolamine in 2 l of glycol monomethyl ether for 8 hours. 1 l of glycol monomethyl ether is then distilled off under vacuum. The dye of the formula:

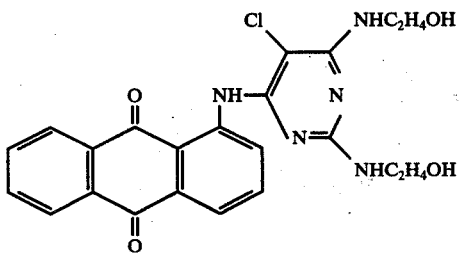

which precipitates on cooling is filtered off, washed and dried. It dyes polyurethane resins yellow according to

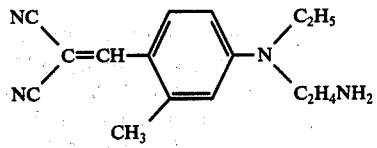

in 2 l of acetone. The reaction mixture is kept neutral by means of 10% sodium hydroxide solution. The resulting product of the formula:

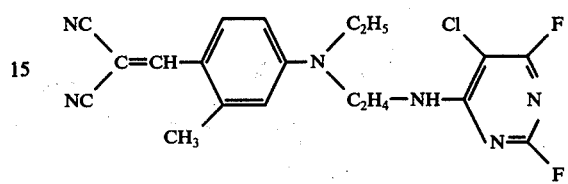

is suction-filtered, washed and dried. 404.5 g of this product are stirred up with 250 g of ethanolamine and 2 l of n-butanol for 6 hours at 90° C. 1.2 l of n-butanol are then distilled off under vacuum. The dye of the formula:

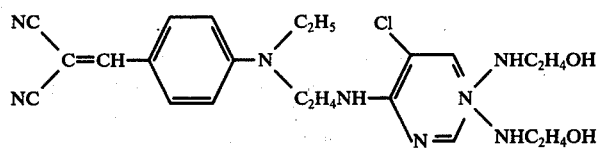

which precipitates on cooling is filtered off, washed and dried. It colours polyurethane resins a green tinged yellow by the process according to Examples 1 to 8.

Another green tinged yellow dye is obtained when cyanuric chloride is used instead of 2,4,6-trifluoro-5-chloro-pyrimidine.

Examples 1 to 8.

Other valuable dyes having the colour tones indicated below are obtained from the components shown in the table, in each case the primary amino groups of anthraquinone having been reacted.

| No. | 1st component | 2nd component | amine | colour tone |
|---|---|---|---|---|
| 1 | 1-amino-4-hydroxy-anthraquinone | 2,4,6-trifluoro-5-chloro-pyrimidine | ethanolamine | red |
| 2 | 1-amino-4-anilino-anthraquinone | 2,4,6-trifluoro-5-chloro-pyrimidine | diethanolamine | blue |
| 3 | 1,4-diamino-anthraquinone | cyanuric chloride | ethanolamine | red with blue tinge |
| 4 | 1,5-diamino-4,8-dihydroxy-anthraquinone | cyanuric chloride | ethanolamine | blue |

EXAMPLE 24

168.5 g of 2,4,6-trifluoro-5-chloro-pyrimidine are added dropwise at 5° C to 256 g of a dye of the formula:

EXAMPLE 25

350 g of the dye of the formula:

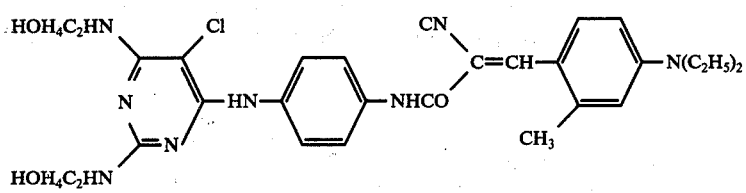

are reacted first with 168.5 g of 2,4,6-trifluoro-5-chloro-pyrimidine and then with 250 g of ethanolamine in a manner analogous to Example 24. The resulting green tinged yellow dye has the formula:

Another green tinged yellow dye is obtained when the tetrahalogen pyrimidine is replaced by cyanuric chloride and a methine dye containing a di-(2-acetoxyethyl)-amino group instead of the diethylamino group is used.

EXAMPLE 26

351.5 of 3-hydroxy-quinophthalone-4-carboxylic acid chloride, 338.5 g of 2,4-di-(2-hydroxyethylamino)-5-chloro-6-(4-aminophenyl)-amino pyrimidine (prepared analogously to Example 11), 90 g of pyridine and 1.5 l of dehydrated chlorobenzene are boiled under reflux for 5 hours. 800 ml of chlorobenzene are then distilled off under vacuum. The yellow dye of the formula

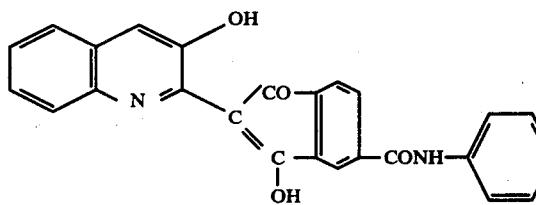

which precipitates on cooling is filtered off, washed and dried.

Other dyes of the colour shades indicated below are obtained when the following components are reacted together in accordance with the procedure described above.

| No. | 1st component | 2nd component | colour tone |
|---|---|---|---|
| 1 | phthaloperinone-9-carboxylic acid chloride | 2,4-di-(2-hydroxy-ethyl-amino)-5-chloro-6-(4-amino-phenyl)-amino-pyrimidine | orange |
| 2 | 3'-hydroxy-6', 7'-dichloro-quino-phthalone-4-carboxylic acid chloride | 2,4-di-(2-hydroxy-ethyl-amino)-6-(4-aminophenyl)-amino-1,3,5-triazine | yellow |
| 3 | 7-chloro-benzoylene-benzimidazole-3-carboxylic acid chloride | 2,4-di-(3-hydroxy-ethyl)-6-(4-amino-phenyl)-amino-1,3,5-triazine | yellow |
| 4 | naphthoylene benzimidazole-4-sulphonic acid chloride | 2,4-di-[bis-(2-hydroxyethyl)-amino]-6-(2,5-dichloro-4-aminophenyl)-amino-1,3,5-triazine | orange |
| 5 | naphthaloperinone-12-carboxylic acid chloride | 2,4-di-[bis-(2-hydroxyethyl)-amino]-6-(4-aminophenyl)-amino-1,3,5-trazine | red with yellow tinge |

EXAMPLE 27

895 g of a copper phthalocyanine-trisulphochloride and 1015.5 g of 2,4-di-(2-hydroxyethylamino)-5-chloro-6(4-aminophenyl)-aminopyrimidine are stirred up in 4 kg of ice and 4 l of water. The reaction mixture is then stirred for 5 hours at 20° C and 2 hours at 50° C and at the same time kept at pH 8 by means of 10% sodium hydroxide solution. The resulting dye of the formula:

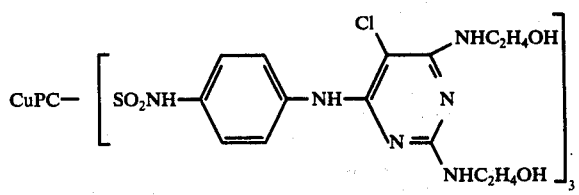

is then suction-filtered, washed and dried.

Green polyurethane resins are obtained with this dye in accordance with Examples 1 to 8.

We claim:

1. Process for dyeing polyurethane resins with dyes which are suitable for incorporation in the resin with the formation of covalent bonds, characterised in that dyes of formula:

wherein:
F denotes the residue of a dye molecule which is free from reactive groups and from water solubilising groups,
B denotes a direct bond or a bridge member, and
A denotes the group:

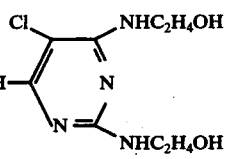

wherein:
M represents N, CH or C—Hal,
Hal represents halogen,
$Z_1$ represents $OZ_2$ or $$N\begin{matrix}X_2\\ \\Y_2\end{matrix}$$

$X_1$ represents an optionally substituted ω-hydroxyalkyl group or ω-hydroxyalkenyl group,
$X_2$, $Y_1$ and $Y_2$ represent hydrogen or optionally substituted alkyl, alkenyl, aralkyl or aryl groups, or $X_1$ and $Y_1$ together with the nitrogen atom form a heterocyclic group, and
$Z_2$ represents an optionally substituted alkyl group with the proviso that at least one of the groups $X_2$, $Y_1$, $Y_2$ and $Z_2$ is an ω-hydroxyalkyl or alkenyl group, are added to the reaction mixture or to one of the components before or during the polyaddition reaction.

2. Process according to claim 1, characterised in that dyes of the following formula:

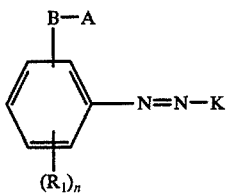

wherein:
R$_1$ denotes hydrogen or a nonionic substituent, K denotes the group of a coupling component, n denotes an integer of from 1 - 4, and
B and A have the meanings indicated for formula (1) are used.

3. Process according to claim 1, characterised in that dyes of the formula:

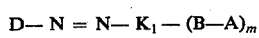

D—N = N— K$_1$—(B—A)$_m$ wherein:
D denotes the group of a carbocyclic or heterocyclic diazo component,
K$_1$ denotes the group of a coupling component, m represents 1 or 2, and B and A have the meaning indicated in claim 1,
are used.

4. Process according to claim 1, characterised in that dyes of the formula:

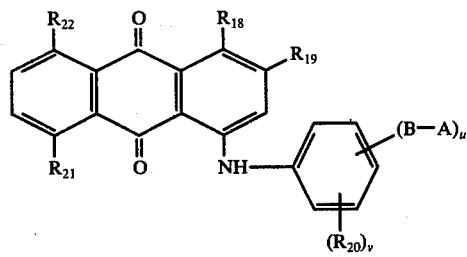

wherein:
A and B have the meaning already indicated, R$_{18}$ denotes H, OH or NH$_2$, R$_{19}$ denotes H, halogen, in particular Cl, Br, I or a phenoxy group optionally substituted by Cl, or OH,
R$_{20}$ denotes H, Cl, Br or OCH$_3$, R$_{21}$ denotes H, OH or NH$_2$, R$_{22}$ denotes H, OH or NH$_2$, u denotes 1-2, and v denotes 1-4,
are used.

5. Process according to claim 1, characterised in that dyes of the formula:

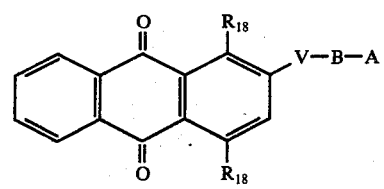

wherein:
V denotes O-phenylene, S-phenylene, O-alkylene-Q-phenylene or S-alkylene-Q-phenylene, alkylene represents C$_1$-C$_4$-alkylene and Q represents a direct bond, O or S, R$_{18}$ represents H, OH or NH$_2$, and
A and B have the meaning indicated in claim 1, are used.

6. Process according to claim 1, characterised in that dyes of the formula:

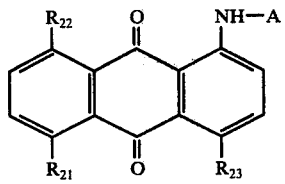

wherein:
A, R$_{21}$ and R$_{22}$ have the meaning indicated in claim 5 and
R$_{23}$ represents H, OH C$_1$-C$_4$-alkoxy or anilino,
are used.

7. Process according to claim 1, characterised in that dyes of the formula:

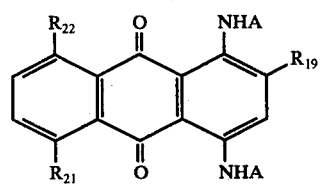

wherein:
A, R$_{19}$, R$_{21}$ and R$_{22}$ have the meaning indicated in claim 5,
are used.

8. Process according to claim 1, characterised in that dyes of the formula

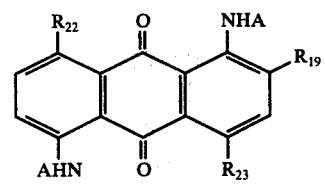

wherein:
A, R$_{19}$, R$_{22}$ and R$_{23}$ have the meaning indicated in claims 5 and 7,
are used.

9. Process according to claim 1, characterised in that dyes of the formula

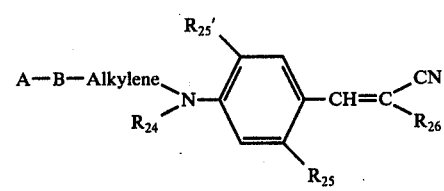

wherein:
R$_{24}$ denotes hydrogen, C$_1$-C$_4$-alkyl or C$_1$-C$_4$-alkyl substituted by halogen, cyanogen, hydroxyl, C$_1$-C$_4$-alkoxy, C$_1$-C$_4$-alkoxy carbonyloxy or C$_1$-C$_4$-alkyl carbonyloxy, $R_{25}$, $R_{25}'$ denotes hydrogen, halogen, $C_1$-$C_4$-alkyl or $C_1$-$C_4$-alkoxy, $R_{26}$ denotes $C_1$-$C_4$-alkyl sulphonyl, carbamyl, $C_1$-$C_4$-alkoxy carbonyl or preferably cyano, and A, B and alkylene have the meanings indicated in claims 1 and 6, are used.

10. Process according to claim 1, characterised in that dyes of the formula:

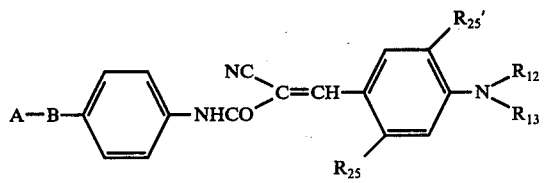

wherein:

$R_{12}$ and $R_{13}$ denote hydrogen or a $C_1$-$C_4$-aklyl group optionally monosubstituted by OH, CN, halogen, $C_1$-$C_4$-alkoxy, $C_1$-$C_4$-alkoxy carbonyl, $C_1$-$C_4$-alkoxy carbonyloxy or $C_1$-$C_4$-alkyl carbonyloxy, and A, B, $R_{25}$ and $R_{25}'$ have the meaning indicated in claim 10, are used.

11. Process according to claim 1, characterised in that bis-styryl dyes are used which are obtained by reacting two dye molecules according to claims 10 or 11 which contain a hydroxyl-substituted group $R_{24}$, $R_{12}$ or $R_{13}$ with a polyvalent acid chloride, acid anhydride or isocyanate.

12. Process according to claim 1, characterised in that dyes of the formula:

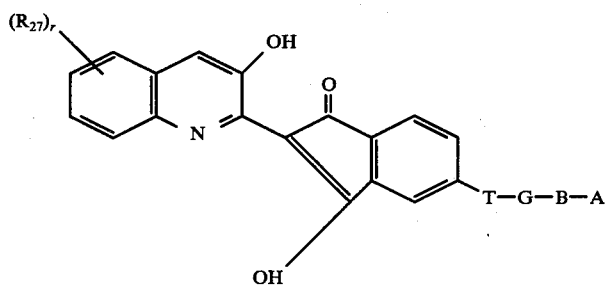

wherein:

T denotes a direct bond, —CO— or —SO$_2$—, r denotes 0 to 4, $R_{27}$ denotes halogen, $C_1$-$C_4$-alkyl, $C_1$-$C_4$-alkoxy, $C_1$-$C_4$-alkyl carbonyl amino, formyl amino or benzoyl amino or 2 groups $R_{27}$ together represent the remaining members of a condensed benzene ring and G represents $C_1$-$C_4$-alkylene or phenylene groups which are optionally substituted by $R_1$ and which are attached to B either directly or through NH or O, and A, B, $R_1$ and alkylene have the meaning mentioned in claims 1, 2 and 6, are used.

13. Process according to claim 1, characterised in that dyes of the formula:

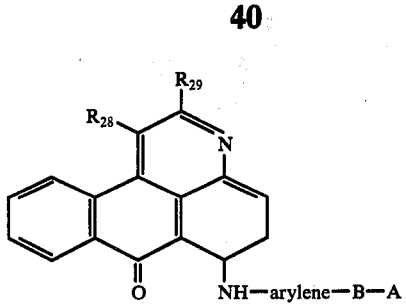

wherein:

$R_{28}$ denotes $C_1$-$C_4$-alkoxy carbonyl, $C_1$-$C_4$-alkyl carbonyl or benzoyl, $R_{29}$ denotes hydroxyl, $C_1$-$C_4$-alkyl or a phenyl group optionally substituted by halogen, NO$_2$, CN, CF$_3$, CONH$_2$, SO$_2$NH$_2$, $C_1$-$C_4$-alkyl and/or $C_1$-$C_4$-alkoxy, arylene denotes a phenylene group optionally substituted by halogen, NO$_2$, $C_1$-$C_4$-alkyl, or $C_1$-$C_4$-alkoxy, and A and B have the meaning mentioned in claim 1, are used.

14. Process according to claim 1, characterised in that dyes of the formula:

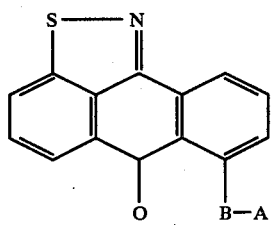

wherein:

A and B have the meaning mentioned in claim 1, are used.

15. Process according to claim 1, characterised in that dyes of the formula:

L — T — G — B — A wherein:

L denotes an optionally halogenated phthaloperinone, naphthaloperinone, benzoylene benzimidazole or naphthoylene benzimidazole group, and T, G, B and A have the meaning mentioned in claim 12, are used.

16. Process according to claim 1, characterised in that dyes of the formula:

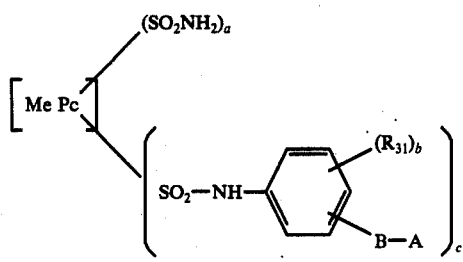

wherein
A and B have the meaning indicated in claim 1,
Me denotes Cu, Ni or Co,
a denotes 0 to 3,
b denotes 1 to 4,
c denotes 1 to 4, and
$R_{31}$ denotes H, $C_1-C_4$-alkyl, $C_1-C_4$-alkoxy, halogen, carbamoyl or sulphamoyl,
are used.

17. Polyurethane resins dyed by the process according to claim 1.

18. Process according to claim 1, characterised in that dyes of the formula:

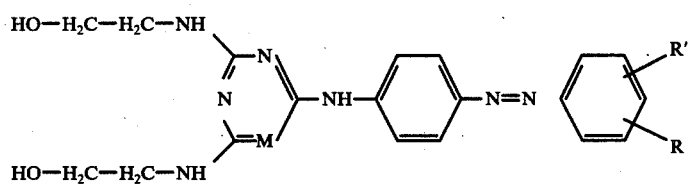

wherein:
R' denotes H, $C_1-C_4$-alkyl, $C_1-C_4$-hydroxyalkyl or polyoxyalkylene
M denotes C—Cl or N and
R denotes H or $C_1-C_4$-alkyl and the phenolic OH-group is in the o- or p-position to the azo group,
are used.

19. Process according to claim 1, characterised in that dyes of the formula:

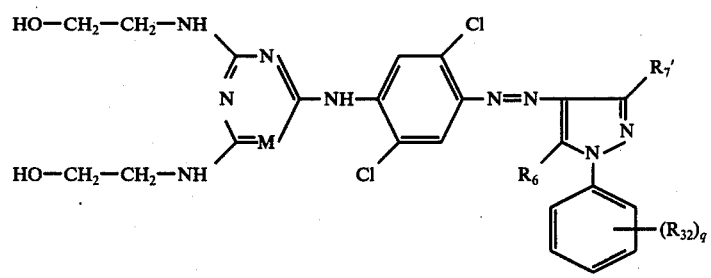

wherein:
M denotes C—Cl or N,
$R_6$ denotes OH or $NH_2$,
$R_7'$ denotes $CH_3$, CN, $CONH_2$, $C_1-C_4$-alkoxy carbonyl, $NH_2$—, acetylamino, benzoylamino or $C_1-C_4$-alkylamino,
$R_{32}$ denotes chlorine or methyl, and
q denotes 0, 1 or 2,
are used.

20. Process according to claim 1, characterised in that dyes of the formula

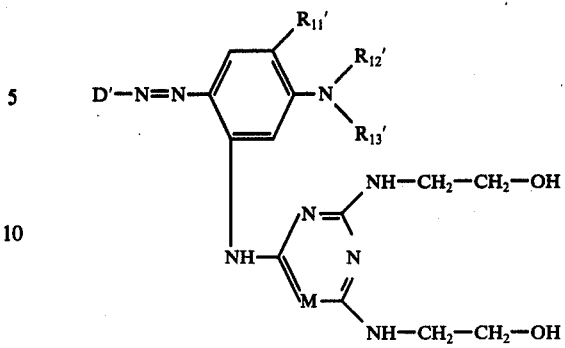

wherein
D' denotes

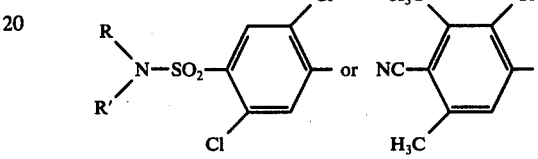

R and R' denote hydrogen or methyl,
$R_{11}'$ denotes hydrogen, methoxy or ethoxy, and $R_{12}'$ and $R_{13}'$ denote hydrogen. $C_1-C_4$-alkyl, hydroxyethyl, cyanoethyl, halogen-$C_1-C_4$-alkyl or $C_1-C_4$-alkylcarbonyloxyethyl,
are used.

21. Process according to claim 1, characterised in that dyes of the formula;

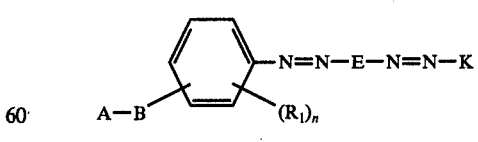

wherein
E is a phenylene or naphthylene group optionally substituted by $C_1-C_4$-alkyl or $C_1-C_4$-alkoxy,
$R_1$ is hydrogen or a nonionic substituent,
n is an integer of from 1-4, and
K is the group of a coupling component,
are used.

* * * * *